Figure 1:
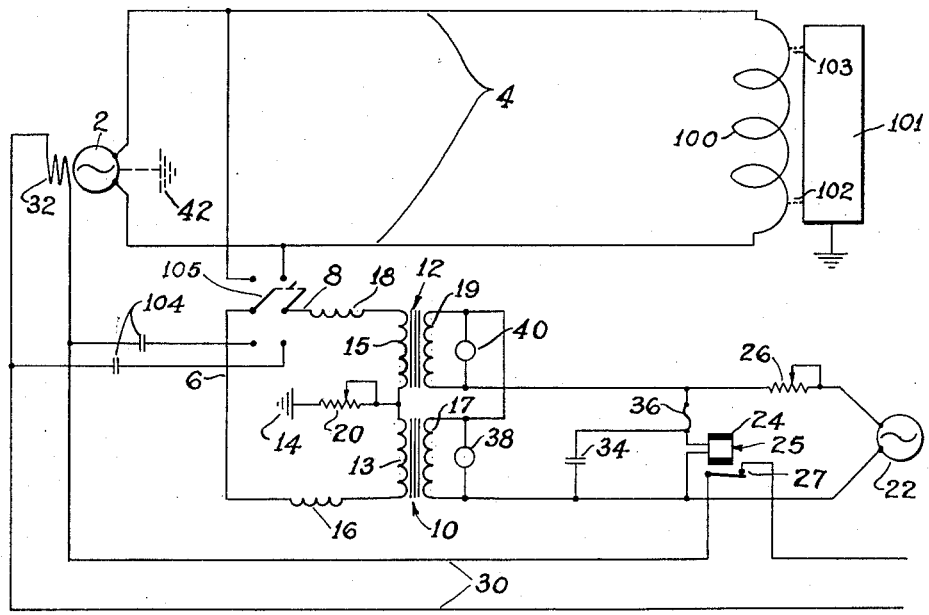

April 29, 1958 T. R. KENNEDY 2,832,916
GROUND DETECTOR
Filed Feb. 17, 1955

INVENTOR.
Theodore R. Kennedy
BY Albert Sperry
ATTORNEY

United States Patent Office 2,832,916
Patented Apr. 29, 1958

2,832,916
GROUND DETECTOR

Theodore R. Kennedy, Lower Makefield Township, Pa., assignor to Ajax Electrothermic Corporation, Trenton, N. J., a corporation of New Jersey Application February 17, 1955, Serial No. 488,874

12 Claims. (Cl. 317—13)

This invention relates to ground detectors and is directed particularly to ground detector mechanisms for protecting equipment against damage due to grounding or short circuits arising from grounding, either in the generator proper or in the generator load circuit.

One of the problems encountered in the use of electrical equipment arises from the fact that grounds or short circuits may occur without warning and cause serious damage to the equipment. For example, a ground may occur in the generator between the alternating current windings and the housing or other parts of the generator. In high frequency induction furnace installations, grounds may occur between parts of the equipment or molten metal may cause a ground upon contact thereof with some part of the inductor circuit or with grounded parts of the furnace housing. When a single ground contact occurs, as when a workman standing on damp ground inserts a conducting tool into the molten metal, there may be no serious damage. However, if a second or repeated grounding occurs or in the event of a short circuit through ground, a large portion of the generator or furnace windings may be destroyed. Moreover, if grounding occurs between an induction furnace melt and its water cooled windings, an explosion may occur which may be very destructive. All such accidents are expensive, both from the standpoint of repairing or replacing the damaged equipment, and from the time lost from production while the equipment is out of order.

Many ground detectors have been developed heretofore and some have actually been used for the protection of high frequency furnaces, and generators and circuits supplying same. However, many if not all of the devices heretofore used or suggested have been subject to criticism because they are too complicated and costly or because they do not "fail safe" or because they require checking from time to time, or because they are not continuously operative or because the parts or auxiliary equipment involved is endangered by stray or leakage currents or because the probing or control voltage is not sufficiently high to detect all types of grounds or for various other reasons.

In accordance with the present invention, these disadvantages of prior art devices are overcome and a ground detector is provided which is dependable in operation and sensitive to substantially all types of grounds. At the same time, the equipment is simple in construction and easy to adjust and maintain. The advantages of the present invention are preferably attained by providing a control circuit with means designed to "fail safe" upon the occurrence of a ground in the generator or load circuit or upon the occurrence of a fault or failure in the control circuit. The control circuit is continuously energized and maintained in an operative balanced condition under normal conditions of operation, but is responsive to both imbalance due to a grounded condition of the circuit to be controlled and to failure of an element of the control circuit itself, to terminate operation of the equipment and thereby afford the desired protection.

In the preferred construction herein shown and described, the device includes two matched transformers having the secondary windings thereof included in the circuit to be controlled with the windings connected in series and having the mid point grounded either directly or through a variable resistance. The opposite ends of the secondaries are connected respectively, either directly or through inductances, to the two sides of the electric circuit of the generator or other circuit to be protected. The primary windings of the transformer are included in the control circuit and are also connected in series but in opposition to each other as referred to the secondary windings.

The opposite ends of the primary windings are connected across the winding of a control relay and through a variable impedance (reactance and/or resistance) to a source of control power having a frequency substantially different from the generator frequency.

The control relay serves to maintain circuits for providing excitation to the generator field, closing load contactors or otherwise maintaining normal operation of the generator and load circuit. Under normal conditions, the net voltage fed back from the generator or load source through the transformers to the control circuit is substantially zero. Similarly, the voltage fed from the control source through the transformers to the generator or load circuit is zero. The control relay is thus energized by the normal operating voltage of the control circuit. However, when a ground occurs in the alternating current windings of the generator or in any portion of the output circuit, a condition of imbalance is created in that the ground effectively short circuits the two transformer secondary circuits as referred to the primary control circuit, causing currents to flow in the transformers. The transformer impedance is thereby reduced whereupon increased current is permitted to flow in the control circuit. The resulting increase in voltage drop across the reactance or resistance causes a lowering of the voltage drop across the relay, and as a result, the control relay is caused to open, breaking the circuits it controls, and thereby, shutting down the generator, sounding an alarm or performing other desired operations.

Moreover, in the event of a failure in the control circuit, the current to the relay obviously will be reduced or cut off and the relay therefore will be de-energized. Thus, it will be seen that a ground occurring in the generator or anywhere in the system will serve to de-energize the relay and shut down the equipment until the ground is located and repaired. In this way, hazards and damage to the equipment is minimized and, consequently, the cost of repairs and the time lost from production are substantially reduced.

Accordingly, it is an object of the present invention to provide a novel ground detector which will afford dependable protection of equipment against damage due to grounding or short circuits due to grounding.

An additional object of the present invention is to provide a novel ground detector which is operable in the event of failure occurring in the control circuit.

A further object of the present invention is to provide a novel ground detector which is sensitive to substantially all types of grounds.

Another object of the present invention is to provide a novel ground detector which is simple in construction and easy to adjust and maintain.

Another object of the invention is to provide a ground detector for a generator and load circuit wherein a control circuit is maintained in a condition of balance during normal operation of the generator and load circuit but is responsive to a ground to create a condition of imbalance to terminate operation of the generator.

A specific object of the present invention is to provide a novel ground detector comprising a pair of opposed transformers, each having their secondaries connected between ground and a separate side of the generator or load circuit and having their primaries connected in series with each other and with a source of control voltage of substantially different frequency than that of the output circuit, and having a relay winding connected across the transformer primaries in shunt relation, said relay winding being energized by the control voltage source through a resistance and being operable, upon de-energization thereof, to open additional circuits for performing various functions, such as setting off an alarm, shutting down the generator and the like.

These and other objects and features of the present invention will be apparent from the following description thereof taken in connection with the figure of the accomanything drawing.

Figure 2:
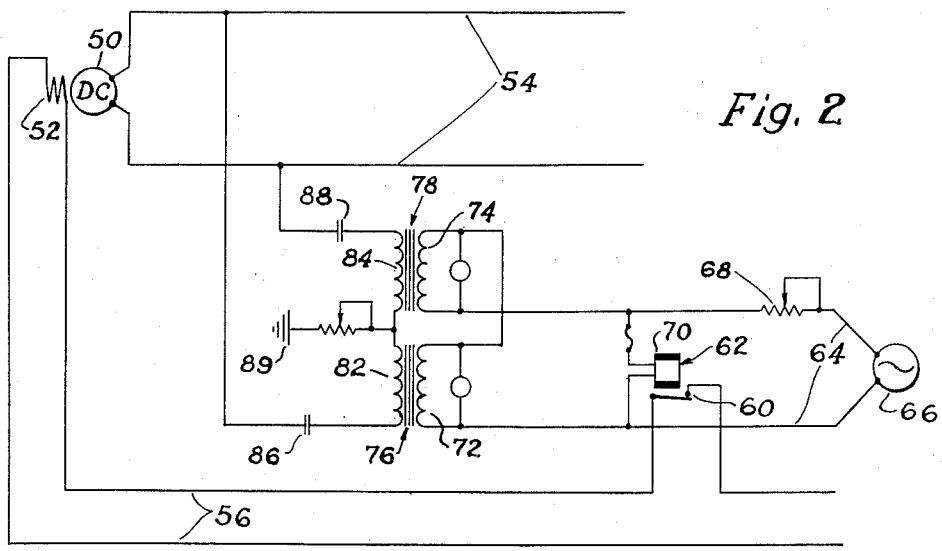

In the drawing:

Fig. 1 is a wiring diagram illustrating a typical ground detector embodying the present invention; and Fig. 2 is a wiring diagram illustrating an alternative form of the present invention.

In that form of the invention chosen for purposes of illustration in Fig. 1, the detector is shown in connection with a high frequency circuit in which a generator 2 supplies energy to an output circuit 4 which is to be protected. A detector lead 6 is connected to one side of the output circuit while another detector lead 8 is connected to the opposite side of the output circuit. Leads 6 and 8 are connected through the secondary windings 13 and 15 of two identical transformers 10 and 12, respectively, to a common ground connection 14.

The primary windings 17 and 19 of the identical transformers are connected in opposition with respect to the secondary or high frequency windings, and thus, no current will flow from the high frequency circuit into the control circuit under normal operating conditions.

Reactances 16 and 18 are included on the high frequency sides of transformers 10 and 12, respectively, to limit or reduce the flow of current in the high frequency side of transformers 10 and 12 when a ground occurs. The reactances 16 and 18 may be external to transformers 10 and 12, as shown, or, if desired, may be included in the design of the transformers. Moreover, if desired, a reactance or resistance 20 may be connected between ground 14 and the midpoint between transformers 10 and 12 to compensate for any deficiency in reactances 16 and 18.

The primary windings 17 and 19 of transformers 10 and 12 are connected in series with each other, but in opposition as referred to the secondary windings 13 and 15. The control circuit is supplied with current from a source of control voltage 22 having a frequency substantially different from the high frequency or load circuit and preferably the current is of lower frequency. Furthermore, the winding 24 of control relay 25 is connected in shunt relation across the transformer primaries and is energized by the control voltage source 22. A reactance or resistance 26 may be inserted in the control line to regulate the flow of current through the relay 25. This reactance or resistance 26 should be of such value that when the normal operating voltage is applied to the control circuit, the contacts 27 of control relay 25 will be maintained in engagement and, thus, complete circuit 30 which provides excitation current for field winding 32 of generator 2. If desired, the control relay may serve to actuate other protective means as, for example, to open or close additional circuits, sound an alarm, or perform other functions as desired in any particular installation.

The control relay may also be provided with a capacitor 34 connected in parallel with the relay windings 24.

This capacitor is preferably of such value as to resonate with the inductive reactance of relay winding 24 when the relay contacts are in the open position and circuit 30 is de-energized. When relay winding 24 is properly energized to maintain the contacts 27 closed, capacitor 34 is out of resonance and serves as a capacitive by-pass for high frequency current which may be accidentally transmitted through transformers 10 and 12.

As pointed out above, the net voltage applied by opposed transformers 10 and 12 on the control circuit is normally zero. Therefore, relay winding 24 is maintained energized solely by current from control source 22. When this is true, contacts 27 are held closed and current can flow in circuit 30 to energize the field 32 of generator 2. However, when a ground occurs, as for example, a ground within the generator windings as indicated at 42, two low resistance circuits are established including the secondary windings 13 and 15 of the identical transformers 10 and 12. The effective impedance of the transformers 10 and 12 will thereby be substantially lowered causing increased current to flow through primary windings 17 and 19 included in the control circuit. The increased current flow in the control circuit causes an increased voltage drop across reactance or resistance 26 and a decreased voltage drop across relay winding 24. The resulting decrease in current flow through relay windings 24 allows contacts 27 to separate whereby circuit 30 is broken and the field winding 32 of generator 2 is de-energized.

Whenever a ground occurs in either the generator winding or in the load circuit and before the ground detector has had time to open the field circuit to the generator or to cause an alarm to be sounded, some irregularity of the voltage across the two matching transformers may result, causing a momentary feedback of current from the load circuit into the control circuit. The amount of feedback will vary with the location of the ground, being greatest in the event the ground occurs at or near the junction between one of the detector leads 6 or 8 and the output circuit 4. The feedback current will be limited, however, by the inherent reactance of the transformers and may be further limited by proper selection of reactances 16 and 18 and reactance or resistance 20. Moreover, capacitor 34 will lower the voltage of the high frequency feedback current and, therefore, will prevent such voltage from energizing the relay winding 24 sufficiently to preclude opening of contacts 27. If it is possible for the high frequency feedback to become too great, in spite of these factors, a fuse or breaker 36 may be provided to open the circuit at a desired overload, thus, removing all voltage and causing relay contacts 27 to open as intended.

Obviously, since relay winding 24 is maintained energized by the control voltage, any fault or failure in the control circuit will lower this voltage and, consequently relay contacts 27 will open. Thus, it will be seen that no ground can occur in either the generator 2, the output circuit 4, or a fault in the control circuit without opening relay contacts 27, and thereby, shutting down the equipment. In this way, faults or grounds may be detected as soon as they occur and the equipment will be shut down before any serious damage can occur, and since no real damage is done until a second ground or short circuit occurs in the load circuit, repair costs and time lost from production will be minimized.

If desired, a further indication of the condition of transformers 10 and 12 may be obtained by connecting high resistance glow lamps 38 and 40 across the transformer primary windings to show proper control current continuity.

The invention has been described with particular reference to the protection of an alternating current generator supplying a main circuit, but it should be understood that the same ground detector device will also protect an induction furnace supplied on said main circuit. In a typical installation the main circuit of Fig. 1 might include an inductor 100 which is usually of hollow, water cooled tubing and is adapted to be supplied by power from the generator to heat a charge 101, here shown for convenience outside of, but normally located within the inductor. The charge may be a molten charge of metal normally protected from contact with the inductor by a non-conducting crucible or refractory liner (not shown), and purposely grounded to protect an operator from shock. If the refractory should deteriorate to a point where contact of the molten metal and inductor were imminent as at 102 or 103 or both, then the ground detector would operate to prevent a damaging arc and possible explosion through the molten furnace bath.

The same ground detector device might be used to protect the field winding of the generator as shown in Fig. 1 but in this instance the ground detector leads 6 and 8 would be disconnected from the main circuit and connected through a switch 105 or otherwise and through blocking capacitors 104 to the field terminals. By this connection the blocking capacitors would prevent direct current from the field supply from entering the ground detector circuit yet the alternating probing voltage would be available in the field circuit to detect a ground therein.

While the invention has been described above with high frequency alternating current in the output circuit and low frequency alternating current in the control circuit, it will be obvious that the detector will be equally effective where low frequency alternating current or direct current is used in the output circuit and a higher frequency current is employed in the control circuit. Thus, as shown in Fig. 2, a D. C. generator 50 is provided with a field winding 52 and serves to supply current to the load line 54 as long as the field winding is supplied with current through circuit 56 by continued engagement of contact 60 of control relay 62. The control circuit 64 is energized from a suitable source of alternating current 66 through a reactor or resistor 68. The winding 70 of the control relay is in shunt relation with respect to the primary windings 72 and 74 of identical transformers 76 and 78. The primary windings are connected in series but are arranged in opposed relation with respect to the secondary windings 84 and 82 of the transformers 76 and 78. Capacitors 86 and 88 prevent flow of D. C. current through the secondary windings 82 and 84 to the ground connection 89.

The operation of the circuit of Fig. 2 is essentially the same as that of Fig. 1 in that the impedance of the primary windings is constant during normal operation and reactor or resistor 68 can therefore be adjusted to insure such current flow through the winding 70 of the control relay to hold contact 60 closed. However, upon the occurrence of a ground in the generator or load circuit, a condition of imbalance is created across the transformers 76 and 78 whereupon the impedance of the primary windings 72 and 74 is decreased and current flow therethrough is increased. As a result there will be an increase in the voltage drop across reactor or resistor 68, and the current flow through the shunted winding of the control relay will fall to release contact 60 and break the field circuit 56 of the generator. A fault in the control circuit of Fig. 2 will produce a similar result.

While the circuits described are typical of those in which the invention may be embodied it will be apparent that numerous variations and changes in the circuit and its applications may be made. Thus, a single properly wound and connected transformer may be used or the secondaries of the transformers may be separately grounded. Numerous other changes and modifications may also be made, and therefore, it should be clearly understood that that the form of the invention described above and shown in the accompanying drawing is intended to be illustrative only and is not intended to limit the scope of the invention.

I claim:

1. In a ground detecting device, a main circuit, a pair of matched transformers, one end of the secondary winding of each of said transformers being connected to ground, the opposite ends of each of said secondary windings being connected respectively to the opposite sides of said main circuit, a source of alternating current control voltage of a frequency substantially different from said main circuit frequency, the primary windings of said transformers being connected in series with said source of control voltage and with each other but in electrically opposed relation as referred to the secondary windings, a relay winding connected across said transformer primaries in shunt relation and normally maintained energized by said source of control voltage, and means controlled by said relay for de-energizing the main circuit on occurrence of a ground therein.

2. In a ground detecting device, a main circuit, a pair of matched transformers, one end of the secondary winding of each of said transformers being connected to ground, the opposite ends of each of said secondary windings being connected respectively to the opposite sides of said main circuit, a source of alternating current control voltage of a frequency substantially different from said main circuit frequency, the primary windings of said transformers being connected in series with said source of control voltage and with each other but in electrically opposed relation as referred to the secondary windings, a relay winding connected across said transformer primaries in shunt relation and normally maintained energized by said source of control voltage, an impedance connected between said relay winding and said source of control voltage, and means controlled by said relay for de-energizing the main circuit on occurrence of a ground therein.

3. In a ground detecting device, a main circuit, a pair of matched transformers, one end of the secondary winding of each of said transformers being connected to ground, the opposite ends of each of said secondary windings being connected respectively to the opposite sides of said main circuit, a source of alternating current control voltage of a frequency substantially different from said main circuit frequency, the primary windings of said transformers being connected in series with said source of control voltage and with each other but in electrically opposed relation as referred to the secondary windings, a relay winding connected across said transformer primaries in shunt relation and normally maintained energized by said source of control voltage, an impedance connected between said relay winding and said source of control voltage, a capacitor connected in parallel with said relay winding, and means controlled by said relay for de-energizing the main circuit on occurrence of a ground therein.

4. An electrical ground detector device comprising a main circuit, fed by alternating current of one frequency and a control circuit fed by alternating current of a substantially different frequency, a pair of matched transformers having their primaries and secondaries connected in series but in opposed relation as referred to each other, the free ends of the secondary windings being connected respectively to the opposite sides of the main circuit and the mid points of said secondary windings being connected together through a common ground, the free ends of the primary windings being connected respectively to the opposite sides of the control circuit, a relay winding connected in shunt across the two primary windings, an impedance connected between said relay winding and the control source, and protective means actuated by said relay upon occurrence of a ground in the main circuit.

5. An electrical ground detector device comprising a main circuit, fed by alternating current of one frequency and a control circuit fed by alternating current of a substantially different frequency, a pair of matched transformers having their primaries and secondaries connected in series but in opposed relation as referred to each other, the free ends of the secondary windings being connected respectively to the opposite sides of the main circuit, and the mid points of said secondary windings being connected together through a common ground, the free ends of the primary windings being connected respectively to the opposite sides of the control circuit, a relay winding connected in shunt across the two primary windings, a capacitor connected in parallel with the relay winding, an impedance connected between said relay winding and the control source, and protective means actuated by said relay upon occurrence of a ground in the main circuit.

6. In combination with a generator and a load circuit, means for protecting the generator and load circuit from injury upon the occurrence of a ground therein, said means including a control circuit, a pair of matched transformers coupling the control circuit and load circuit and arranged with the primary windings of both transformers connected in series in the control circuit, the secondary windings of both transformers being connected in series with a ground connection therebetween, the opposite ends of the secondary windings being connected respectively to the opposite sides of said load circuit, the matched transformers being in electrically opposed relation with respect to each other whereby the reactance of the primary windings to the control voltage will be reduced upon the occurrence of a ground in the generator or load circuit, and control means actuated by said control circuit to maintain said generator and load circuit normally operative but responsive to a reduction in the reactance of said primary windings to render the generator and load circuit inoperative.

7. A ground detector for protecting a generator and the output circuit thereof, said detector comprising a pair of matched transformers, one end of the secondary side of each of said transformers being grounded, the opposite end of the secondary of one of said transformers being connected to one side of the circuit to be protected, the opposite side of the secondary of the other of said transformers being connected to the other side of said circuit to be protected, a control circuit including a source of alternating current, the primary sides of said transformers being connected in series with each other in said control circuit and in electrically opposed relation with respect to said secondary windings, a relay having a winding connected across said transformer primaries in shunt relation and normally maintained energized by said source of alternating current, an impedance connected between said relay winding and said source, a capacitance connected in parallel with said relay winding, and circuits controlled by said relay for de-energizing the field of said generator.

8. A ground detector for protecting a generator and the output circuit thereof, said detector comprising a pair of matched transformers arranged in electrically opposed relation, the secondary windings of said transformers having one end thereof grounded and having the opposite ends thereof connected respectively to a separate side of the circuit to be protected whereby occurrence of a ground in said circuit to be protected will lower the reactance of the primary windings of said transformers to the control voltage, a source of control voltage, a relay having a winding normally maintained energized by said source of control voltage, the primary windings of said transformers being connected in electrically opposing relation but in series with each other and in shunt with said relay winding whereby lowering of the reactance of said primary windings will decrease the rate of current flow through said relay winding, and means controlled by said relay for shutting down said generator.

9. In combination, a generator, an output circuit supplied by said generator, a pair of matched transformers arranged in electrically opposed relation, the secondary windings of each of said transformers being connected between ground and a separate side of said output circuit whereby grounds in said output circuit will decrease the reactance of the primary windings of said transformers, a source of control voltage of different frequency from that supplied to the output circuit by said generator, a relay having a winding normally maintained energized by said source of control voltage, an impedance between said relay winding and said source of control voltage, the primary windings of said transformers being connected in series with each other and in shunt with said relay winding whereby variations in the reactance of said primary windings will decrease the voltage across said relay winding, circuits controlled by said relay for de-energizing the field of said generator, and a capacitor connected in parallel with said relay.

10. In combination, a generator, an output circuit supplied by said generator, a pair of matched transformers arranged in electrically opposed relation, the secondary windings of each of said transformers being connected between ground and a separate side of said output circuit whereby grounds in said output circuit will decrease the reactance of the primary windings of said transformers, a source of control voltage of different frequency from that supplied to the output circuit by said generator, a relay having a winding normally maintained energized by said source of control voltage, an impedance between said relay winding and said source of control voltage, the primary windings of said transformers being connected in series with each other and in shunt with said relay winding whereby variations in the reactance of said primary windings will decrease the voltage across said relay winding, circuits controlled by said relay for de-energizing the field of said generator, and means connected between said secondary windings and said output circuit operable to oppose feedback of alternating current from said transformers to said output circuit.

11. In a ground detecting device, a circuit to be controlled, a pair of matched transformers, one end of the secondary winding of each of said transformers being connected to ground, the opposite ends of each of said secondary windings being connected respectively to the opposite sides of said circuit to be controlled, a source of alternating current control voltage of a frequency substantially different from that of the circuit to be controlled, the primary windings of said transformers being connected in series with said source of control voltage and with each other but in electrically opposed relation as referred to the secondary windings, a relay winding connected across said transformer primaries in shunt relation and normally maintained energized by said source of control voltage, and means controlled by said relay for de-energizing the circuit to be controlled on occurrence of a ground therein.

12. A ground detecting device comprising a main circuit, a pair of matched transformers, one end of the secondary winding of each of said transformers being connected to ground, the opposite end of each of said secondary windings being connected respectively to the opposite sides of said main circuit, a source of alternating current control voltage, the primary windings of said transformers being connected in series with said source of control voltage and with each other but in electrically opposed relation as referred to the secondary windings, and means responsive to changes in the reactance of said control circuit for indicating a ground in said main circuit.

References Cited in the file of this patent

UNITED STATES PATENTS

| | | |
|---|---|---|
| 1,903,001 | Jonas | Mar. 28, 1933 |
| 2,700,125 | King | Jan. 18, 1955 |